United States Patent
Dassoulas et al.

(10) Patent No.: US 6,286,217 B1
(45) Date of Patent: *Sep. 11, 2001

(54) RECIPROCATING SAW WITH PIVOTED ARM DRIVE

(75) Inventors: Stephen C. Dassoulas, Baltimore; Richard C. Nickels, Jr., Hampstead, both of MD (US)

(73) Assignee: Black & Decker Inc., Newark, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/057,705

(22) Filed: Apr. 9, 1998

(51) Int. Cl.[7] .................................................. B23D 49/00
(52) U.S. Cl. ................................. 30/392; 30/220; 83/748
(58) Field of Search ............................. 30/210, 216, 218, 30/220, 217, 392, 393, 394, 209; 173/162.1, 114, 205; 74/60; 83/615, 748

(56) References Cited

U.S. PATENT DOCUMENTS

| Re. 35,258 | 6/1996 | Palm . |
|---|---|---|
| 3,729,823 | 5/1973 | Bos et al. . |
| 3,820,543 | 6/1974 | Vanjushin et al. . |
| 3,945,120 | 3/1976 | Ritz . |
| 4,038,721 | 8/1977 | Kendzior . |
| 4,145,811 * | 3/1979 | Kendzior . |
| 4,699,036 | 10/1987 | Henne . |
| 4,924,727 * | 5/1990 | Pearl et al. . |
| 5,025,562 | 6/1991 | Palm . |
| 5,079,844 | 1/1992 | Palm . |
| 5,099,705 | 3/1992 | Dravnieks . |
| 5,209,022 | 5/1993 | McCambridge . |
| 5,450,925 * | 9/1995 | Smith et al. ................... 30/392 X |
| 5,555,626 * | 9/1996 | Fuchs ................................ 30/393 |
| 5,561,909 * | 10/1996 | Berg et al. . |
| 5,782,000 * | 7/1998 | Bednar . |

FOREIGN PATENT DOCUMENTS

| 652280 | 10/1937 | (DE) . |
|---|---|---|
| 2613092 | 11/1976 | (DE) . |
| 2650470 | 5/1978 | (DE) . |
| 8808036 | 10/1988 | (DE) . |
| P3826901 | 12/1989 | (DE) . |
| P4108982 | 6/1992 | (DE) . |
| 93200782 | 9/1993 | (EP) . |
| 93201866 | 2/1994 | (EP) . |
| 1312025 | 4/1973 | (GB) . |
| 2042973 | 10/1980 | (GB) . |

OTHER PUBLICATIONS

Mechanisms & Mechanical Devices Sourcebook, Copyright 1991, p. 95, Cover and Copyright Pages, month unknown.

* cited by examiner

Primary Examiner—Kenneth E. Peterson
(74) Attorney, Agent, or Firm—Michael P. Leary

(57) ABSTRACT

A reciprocating saw 11 comprises an output shaft 21 mounted for reciprocal motion in a housing 13. A counterweight 27 is mounted in the housing for reciprocal movement relative to the output shaft. A first drive 37 is connected between a motor and the output shaft for reciprocally driving the output shaft. A second drive 39 is connected between the motor 19 and the counterweight for reciprocally driving the counterweight. The second drive 39 preferably comprises a pivot arm 41 pivotally mounted about an axis transverse to the output shaft for receiving at a first location a reciprocating input in a first direction 40 and for producing at a second location a reciprocating output in a second direction 42 different from the first direction. The first and second drives provide a compact, low vibration, relatively simple, counterbalanced drive train for the saw.

19 Claims, 4 Drawing Sheets

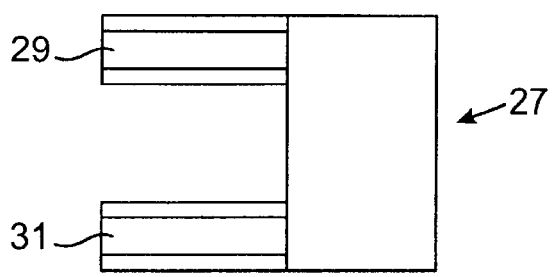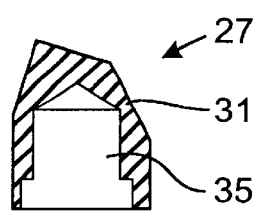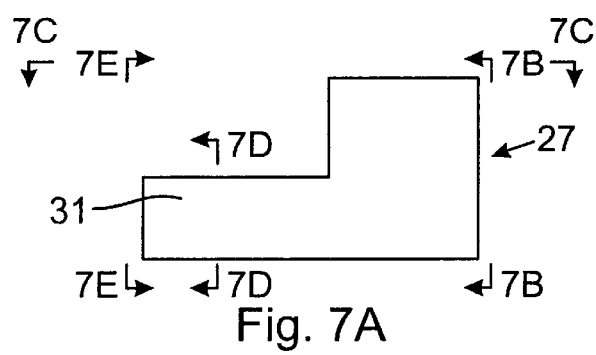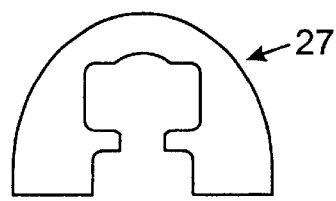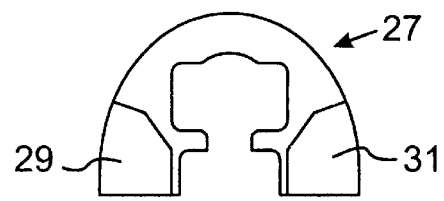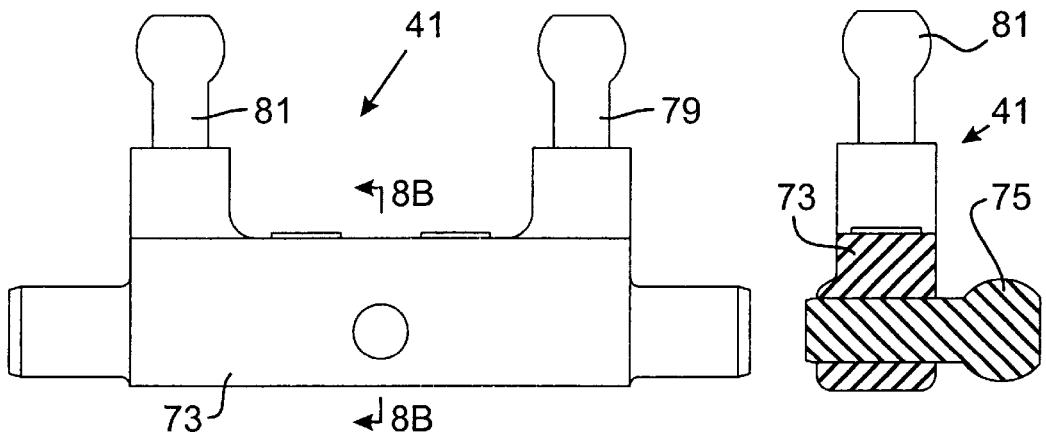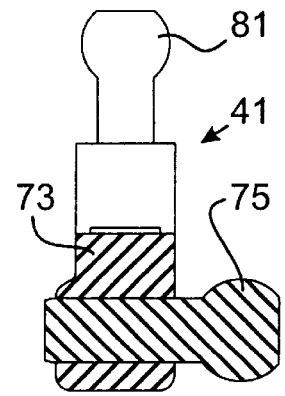

RECIPROCATING SAW WITH PIVOTED ARM DRIVE

FIELD OF THE INVENTION

The present invention relates to reciprocating saws and more particularly to a drive train for such saws.

BACKGROUND OF THE INVENTION

Inline reciprocating saws. Inline saws have the motor axis and the axis of reciprocation of the blade parallel and the driving of the blade output shaft changes the center of gravity of the saw and generates high vibration. Without counterbalancing of the drive train, such vibration requires the speed of the blade to be limited to keep the vibration to an acceptable level. Accordingly, high performance reciprocating saws often incorporate counterbalancing to reduce the vibration caused by the reciprocation of the drive train for the blade. With counterbalancing, higher blades speeds and higher cutting rates can be achieved with an acceptable level of vibration.

Examples of counterbalanced reciprocating saws are disclosed in U.S. Pat. No. 5,079,844; U.S. Pat. No. 5,025,562; and U.S. Pat. No. 3,945,120. As disclosed in these patents, it is known to use wobble plate, bevel gear, and cam drives to drive the output shaft and counterbalance of the saw. Acceptable performance can be achieved using such drive trains. However, further improvement of such drive trains is desirable. Low cost, simplicity of design, light weight, low vibration, and compactness are continuing design objectives in the design of improved, commercially acceptable drive trains for counterbalanced, inline reciprocating saws.

SUMMARY OF THE INVENTION

The present invention has multiple aspects. According to one aspect of the invention, a reciprocation saw comprises an output shaft mounted for reciprocal motion in a housing. A counterweight is mounted in the housing for reciprocal movement relative to the output shaft. A first drive is connected between a motor and the output shaft for reciprocally driving the output shaft. A second drive is connected between the motor and the counterweight for reciprocally driving the counterweight. One of the first and second drives comprises a pivot arm pivotally mounted about an axis transverse to the output shaft for receiving at a first location a reciprocating input in a first direction and for producing at a second location a reciprocating output in a second direction different from the first direction.

Preferably the one of the drives including the pivot arm ("pivot arm drive") is the second drive for driving the counterweight. A pivot arm drive may also be used to drive the output shaft in addition to the counterweight. The pivot arm may comprises a cross bar with at least one end and preferably two posts at one end of the arm and a lifter rod at the other end of the arm. In the preferred embodiment, the counterweight is saddle shaped and is slidably mounted on the output shaft. The posts are connected to two rearwardly extending legs of the counterweight.

Preferably the pivot arm drive includes (1) a cam fixed to a drive shaft connected to the motor and (2) sleeve fixed against rotation in the housing and mounted on and permitting rotation of the cam. The sleeve provides a linear reciprocating input to the second end of the pivot arm.

Preferably the first drive is a wobble plate drive and both the first and second drives are driven by a common drive shaft.

According to a second aspect of the invention, a reciprocating saw comprises an output shaft mounted for reciprocal motion fore and aft in a housing. A drive shaft is drivable by a motor and mounted in the housing for rotary motion about a first axis. A first drive for reciprocally driving the output shaft is connected between the drive shaft and the output shaft. A counterweight is slidably mounted in the housing and reciprocally drivable relative to the output shaft. A second drive is connected between the counterweight and the output shaft for reciprocally driving the counterweight. One of the first and second drives comprises a cam lifter including: a cam rotatable with the drive shaft; and a sleeve fixed against rotation relative to the housing, mounted on the cam and movable in a linear reciprocating direction transverse to the first axis when the cam is driven by the drive shaft.

Preferably the one drive of the first and second drives including the cam lifter is the second drive. The one drive preferably includes a pivot arm as described above in connection with the first aspect of the invention.

According to a third aspect of the present invention, a drive train for a reciprocating saw comprises a drive shaft connected to and drivable by a motor for rotation about a first axis. A cam is fixed to and drivable by the drive shaft. A sleeve is fixed in the housing against rotation relative to the drive shaft, is mounted on and permits rotation of the cam. The sleeve generates a linear reciprocating output along a second axis generally transverse to the first axis when the cam is rotated by the drive shaft. A pivot arm is pivotably mounted in the housing about a third axis transverse to the first and second axes for transferring and changing the direction of the reciprocating output of the sleeve. The pivot arm has a first end for providing an arcuate reciprocating output and a second end connected to the sleeve for receiving the linear reciprocating output from the sleeve.

The drive train is preferably used for the driving of a counterbalance for the reciprocating saw. Although the pivot arm drive is preferred for use in a counterbalanced saw, the drive may also be used to drive the output shaft in a reciprocating saw without counterbalancing.

BRIEF DESCRIPTION OF THE DRAWINGS

The accompanying drawings which are incorporated in, and constitute a part of, this specification illustrate one embodiment of the invention and together with the description serve to explain the principles of the invention.

FIG. 7A is a side elevator view of the counterweight for the saw of FIG. 1.

FIG. 7B is a front elevational view of the counterweight taken along lines 7B—7B of FIG. 7A.

FIG. 7C is a top plan view of the counterweight taken along lines 7C—7C of FIG. 7A.

FIG. 7D is a front elevational view of the counterweight taken along lines 7D—7D of FIG. 7A.

FIG. 7E is a front elevational view of the counterweight taken along lines 7E—7E of FIG. 7A.

FIG. 8A is a front elevation view of the pivot arm for the saw of FIG. 1.

FIG. 8B is a cross-sectional view taken along the line 8B—8B of FIG. 8A.

DESCRIPTION OF THE PREFERRED EMBODIMENT

Figure 1:
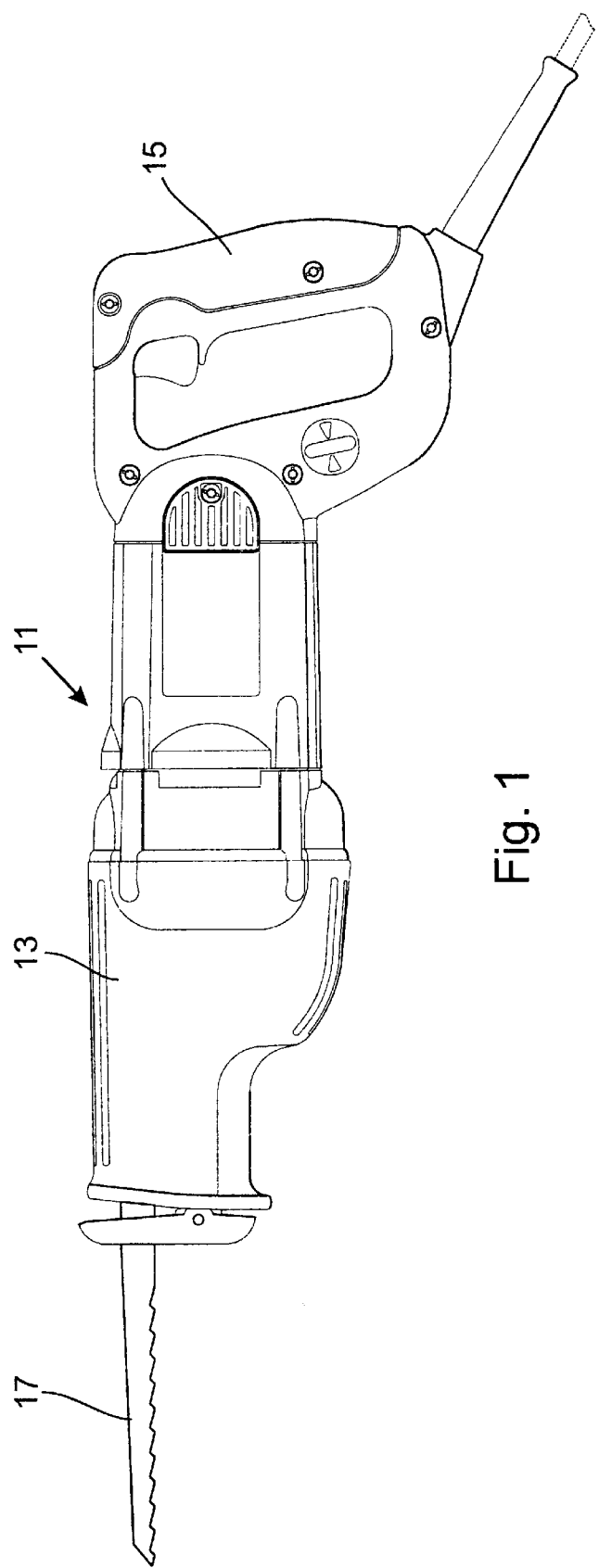
FIG. 1 shows a left side elevational view of a reciprocating saw in accordance with a preferred embodiment of the present invention.

The present invention is directed to a reciprocating saw 11 preferably of the type depicted in FIG. 1 and used for rough cutting applications such as plumbing, heating, ventilating and air conditioning. Such reciprocating saws have a reciprocating drive output which can either be linear or orbital. While not preferred the invention can also be embodied in a type of reciprocating saw commonly known as a jigsaw.

According to the present invention as shown in FIG. 1, a reciprocating saw 11 comprises a housing 13 which is preferably elongated with a handle 15 located at one end and a thin elongated blade 17 at the other. Other housing configurations can also be used.

Figure 2:
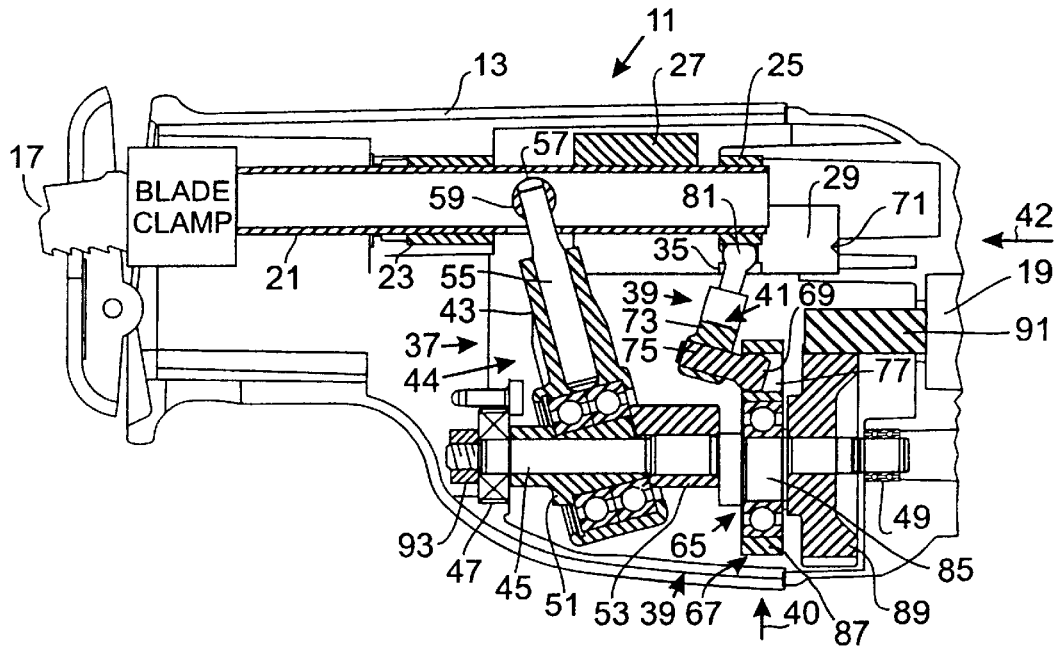
FIG. 2 shows an axial cross sectional view of the saw of FIG. 1 illustrating a first drive for the output shaft of the saw in a forward position and a second drive for a counterweight in a rearward position.
Figure 3:
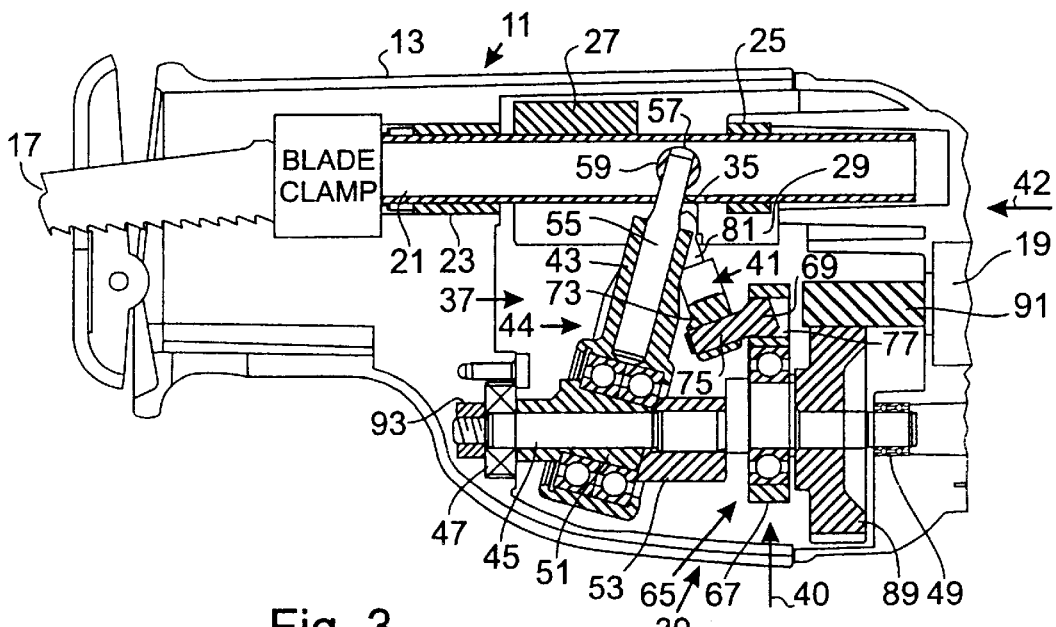
FIG. 3 shows a view similar to FIG. 1 except that the first drive for the output shaft is in a rearward position and the second drive for the counterweight is in a forward position.
Figure 4:
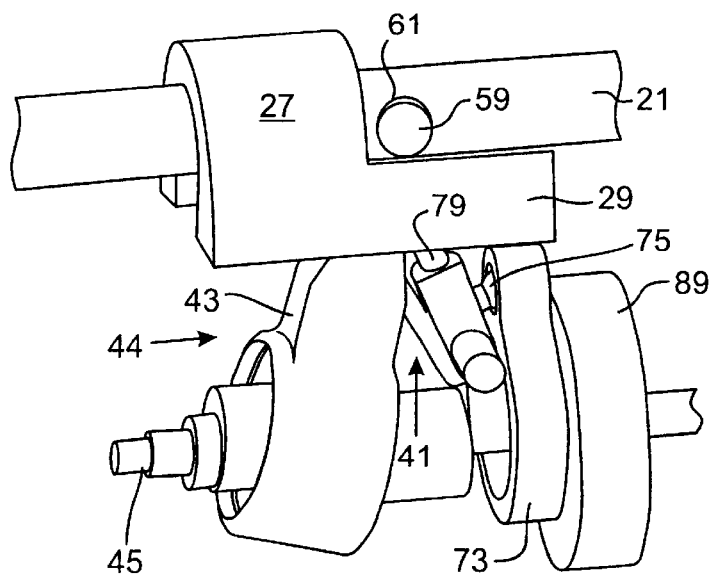
FIG. 4 is schematic left front side perspective view of the first drive for the output shaft in its rearward position and the second drive for the counterweight in its forward position as illustrated in FIG. 3.
Figure 5:
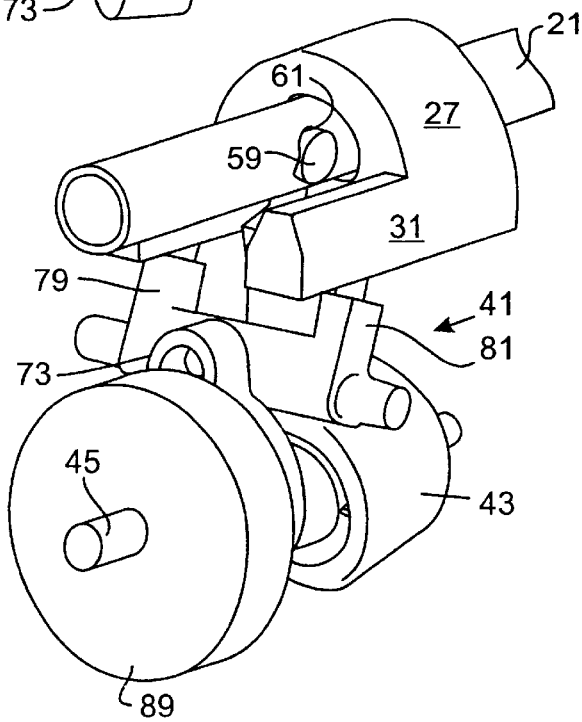
FIG. 5 is a schematic right rear side perspective view of the first and second drives in the position shown in FIG. 4.
Figure 6:
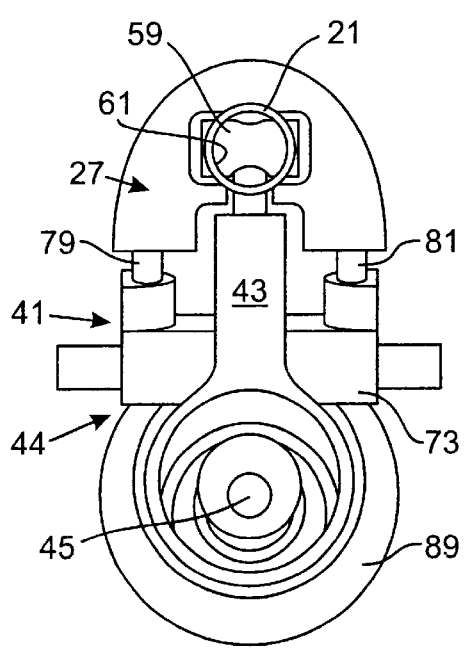
FIG. 6 is a schematic front elevational view of the first and second drives in the position shown in FIG. 4.

According to the present invention as shown in FIGS. 2 and 3, the saw 11 further comprises a motor 19 disposed in the housing 13. The motor 19 is preferably a conventional motor such as a universal or permanent magnet dc motor commonly used for power tool applications.

According to the present invention as shown in FIGS. 2 and 3, the saw 11 further comprises an output shaft 21 mounted for reciprocal motion in the housing 13. Preferably, output shaft 21 is supported in spaced bearings 23, 25 for linear reciprocation. The output shaft 21 is preferably tubular but may be of any conventional construction such as, for example, depicted in U.S. Pat. No. 4,976,164. A tubular shaft is particularly advantageous as such a construction reduces the mass of the reciprocating shaft thereby simplifying counterbalancing and reducing the weight of the saw 11.

According to the present invention as shown in FIGS. 2–7, the saw 11 further comprises a counterweight 27 mounted in the housing 13 for reciprocal movement relative to the output shaft 21. The counterweight 27 and output shaft 21 are driven 180° out of phase to eliminate vibration of the saw 11. The counterweight 27 is preferably slidably mounted directly on the output shaft 21. Alternatively the counterweight 27 can be slidably mounted on a support intermediate the output shaft 21 and the counterweight 27. Preferably, the counterweight 27 is saddle shaped with rearwardly extending first and second opposed legs 29, 31 located on opposite sides of the output shaft 21. First and second apertures 33, 35 are formed respectively in the legs 29, 31 to receive a first end of a pivot arm 41 as will be explained below.

According to the present invention as shown in FIGS. 2–6, the saw 11 further comprises first and second drives 37, 39. The first drive 37 is connected between the motor 19 and the output shaft 21 for reciprocally driving the output shaft 21. The second drive 39 is connected between the motor 19 and the counterweight 27 for reciprocally driving the counterweight 27. One of the first and second drives 37, 39 comprises a pivot arm 41 pivotally mounted about an axis transverse to the output shaft 21 for receiving at a first location a reciprocating input in a first direction 40 and for producing at a second location a reciprocating output in a second direction 42 different from the first direction.

The first drive 37 is preferably a conventional wobble plate drive 44 including a wobble arm 43 mounted on a drive shaft 45 by a pair of bearings 47, 49 and angular sleeves 51–53. The wobble arm 43 is connected to the output shaft 21 through a drive pin 55 slidably received in an opening 57 of a pivot pin 59. Pivot pin 59 is pivotally mounted in transverse opening 61 in output shaft 21.

The second drive 39 is preferably constituted by a pivot arm drive 65 including the pivot arm 41 (FIG. 8) and a cam lifter 67 driven by the drive shaft 45. The pivot arm 41 has a first or input end 69 for receiving a first reciprocal drive input in a first direction 40 and a second or output end 71 for providing a reciprocal drive output in a second direction 42 different from the first direction. The pivot arm 41 comprises a cross bar 73 pivotally mounted in the housing 13 in a pair of sleeve bearings (not shown) about an axis transverse to the axis of rotation of drive shaft 45. The first end of the pivot arm 41 is constituted by a lifter rod 75 extending from the cross bar 73 and connected at its distal end in an aperture 77 of the cam lifter 67. The second end of the pivot arm 41 is formed by first and second spaced posts 79, 81 extending from the cross bar 73 and connected at their distal ends in apertures 33, 35 of the counterweight 27. The posts 79, 81 and lifter rod 75 are each formed with a spherical bearing permitting sliding and pivotal movement of the distal ends in the apertures 33, 35 as the counterweight 27 is reciprocated on the output shaft 21.

The cam lifter 67 (FIGS. 2–4) preferably includes a cam 85 fixed to and rotatable with the drive shaft 45 and a sleeve 87 fixed against rotation in the housing 13. The cam 85 may be integrally formed on the shaft 45. The sleeve 87 is mounted on and permits rotation of the cam 85 and is movable in a linear reciprocating direction transverse to the axis of the drive shaft 45 when the cam 85 is driven by the drive shaft 45. The sleeve aperture 77 receives the spherical bearing of the second end of the pivot arm 41 and transfers the linear reciprocating output of the sleeve 87 to the pivot arm 41. Through the connection of the sleeve aperture 77 to the lifter rod 75 of the pivot arm 41, the sleeve 87 is fixed against rotation in the housing 13.

As noted above, the first and second drives 37, 39 are preferably constituted, respectively, by the wobble plate drive 44 and the pivot arm drive 65. Other arrangements of the drives 37, 39 may be used. For example, both the first and second drives 37, 39 may be constituted by the pivot arm drive 65. The first drive 37 may be constituted by the pivot arm drive and the second drive 39 may be constituted by a wobble plate drive 44. In embodiments of the invention in which the pivot arm drive 65 is used to drive the output shaft 21, the second or output end 71 of the pivot arm 41 will be formed by a single post 83 slidably and pivotally connected to the output shaft 21. The preferred embodiment (with the pivot arm drive 65 used to drive the counterweight 27) is advantageous because the pivot arm drive 65 provides a balanced drive input through the spaced connection of posts 79, 81 to counterweight legs 29, 31. Also as depicted in FIG. 3, at the end points of the rearward stroke of the wobble plate drive 44 and the forward stroke of the pivot arm drive 65, the posts 79, 81 and wobble arm 43 can be laterally overlapping so as to permit the drives 37, 39 to be arranged in a compact configuration.

Preferably the saw 11 further comprises the drive shaft 45 (FIGS. 2–6) extending parallel to the output shaft 21 and connected between the motor 19 and the pivot arm 41 and between the motor 19 and the wobble plate drive 44. The drive shaft 45 is rotatable in bearings 47, 49 about an axis parallel to the output shaft 21 and provides a drive input for both the first and second drives 37, 39. A drive input to the drive shaft 45 from the motor 19 is provided through a spur gear 89 fixed to drive shaft 45 and driven by the armature shaft 91 of the motor 19. The cam lifter 67 is driven by the drive shaft 45 through the cam 85 to provide a drive input for the second drive 39. The wobble plate drive 44 is driven by the drive shaft 45 through angular sleeves 51–53 which rotate with the drive shaft 45. Angular sleeves 51, 53 are fixed to shaft and therefore rotate with drive shaft 45. Angular sleeve 51 is slidably mounted on drive shaft 45 and rotates with drive shaft 45 because of the nonparallelism of the axes of the drive shaft 45 and the sleeve 51. Thus as shown in FIGS. 2, 3 the wobble plate drive 44 is driven by the drive shaft 45 through angular sleeves 51–53 for causing the fore and aft wobble drive motion of wobble arm 43 and drive pin 55. FIGS. 2 and 3 depict respectively the end points of the forward and rearward strokes of the wobble arm 43 and the rearward and forward strokes of the pivot arm drive 65. The drive components are held in assembly on the drive shaft 45 by a nut 93 threaded on the end of drive shaft 45.

Optimally both of the first and second drives 37, 39 are driven by the single drive shaft 45 for simplicity, reduced weight and lower cost. However, if desired separate input drive trains from the motor 19 can be provided to the first and second drives 37, 39.

In operation, the output shaft 21 and the counterweight 27 are driven 180° out of phase by the wobble plate drive 44 and the pivot arm drive 65, respectively. The drive input to the wobble plate drive 44 and pivot arm drive 65 is provided from motor 19 through a single drive shaft 45 driven through spur gear 89. To drive the counterweight 27, as the drive shaft 45 is driven, cam 85 is rotated and drives sleeve 87 to provide a linear reciprocating output to the input or first end of pivot arm 41. The pivot arm 41 is then pivoted to transfer and change the direction of the drive input to provide an arcuate drive output at the second or output end 71 of the pivot arm 41. The drive output as may be seen has been changed in direction from generally perpendicular to generally parallel to the output shaft 21. The drive output of the pivot arm 41 is transferred to the counterweight 27 through the pivotal and sliding connection of the posts 79, 81 to the legs 29, 31 of the counterweight 27. As a result, the counterweight 27 is linearly reciprocated fore and aft on output shaft 21.

To drive the output shaft 21, as the drive shaft 45 is driven, angular sleeves 51–53 are driven by the drive shaft 45 and cause the wobble arm 43 to reciprocate fore and aft as shown by FIGS illustrating the end points of the forward and rearward strokes of the wobble arm 43. The output at the tip of drive pin 55 is arcuate and accordingly the drive pin 55 slides in opening 57 in pivot pin 59 and pivots with the pivot pin 59 in transverse opening 61 in output shaft 21 to accommodate the arcuate movement of drive pin 55. As a result of the arcuate output of the drive pin 55 to the output shaft 21, the output shaft 21 is linearly reciprocated 180° out of phase with the linear reciprocation of the counterweight 27.

A reciprocating saw 11 in accordance with the present invention provides a number of advantages. First the pivoted arm drive is relatively light weight, has relatively few parts and is simple in design. Secondly, when used to drive the counterweight 27 through the posts 79, 81, the drive input to the counterweight 27 is balanced producing less vibration and greater reliability. Thirdly when the pivot arm drive 65 is used in combination with the wobble plate drive 44 for the output shaft 21, the entire drive train for the output shaft 21 and the counterbalance is compact. The compactness results primarily from the ability to have components of the two drive trains to be laterally overlapping during the rearward stroke of the wobble plate drive 44 and the forward stroke of the pivot arm drive 65. Other advantages will be apparent to those skilled in the art.

Various modifications and variations can be made in a saw 11 according to the present invention without departing from the scope or spirit of the invention. The present invention is intended to cover these modifications and variations provided they come within the scope of the appending claims and their equivalents.

What is claimed is:

1. A reciprocating saw comprising:
    a housing;
    an output shaft mounted for reciprocal motion fore and aft in the housing along a longitudinally extending axis;
    a motor mounted in the housing;
    a drive shaft driven by the motor and mounted in the housing for rotary motion about a drive shaft axis;
    a first drive connected to the drive shaft and the output shaft for reciprocally driving the output shaft;
    a counterweight slidably mounted in the housing and reciprocally drivable relative to, and along the longitudinal axis of the output shaft; and
    a second drive interconnecting the counterweight and the drive shaft for reciprocally driving the counterweight, the second drive attached to the counterweight on opposite sides of the longitudinally extending axis;
    wherein the counterweight is unitarily formed to at least partially defined a channel such that the first drive is permitted to reciprocate within the channel.

2. The reciprocating saw of claim 1 wherein the second drive includes a pivot arm having a cross bar extending in a direction substantially perpendicular to the longitudinally extending axis and first and second spaced posts upwardly extending from the cross bar and coupled to the counterweight.

3. The saw of claim 2 wherein the pivot arm is pivotal about a pivot axis (1) transverse to the longitudinally extending axis and (2) spaced between the drive shaft and output shaft.

4. The saw of claim 2 wherein the first end of the pivot arm has a spherical bearing formed on its distal end, and further including a cam lifter having a cam and a sleeve, the cam fixed to and rotatable with the drive shaft, the sleeve fixed against rotation relative to the housing, mounted on and permitting rotation of the cam and having an aperture for receiving the spherical bearing of the first end of the pivot arm.

5. The saw of claim 2 wherein the first and second posts have first and second spherical bearings formed, respectively, at the distal ends of the first and second post, and the counterweight has first and second spaced apertures for slidably and pivotally receiving respectively the first and second spherical bearings.

6. The saw of claim 2 wherein the counterweight is saddle shaped, the counterweight being slidably mounted on the output shaft and having rearwardly extending first and second opposed legs located on opposite sides of the output shaft, the first and second opposed legs having the first and second apertures formed respectively therein for receiving the first and second posts.

7. The saw of claim 1 wherein the first drive includes a wobble plate drive having a drive arm connected to the output shaft forwardly of the second drive, the wobble plate drive and the pivot arm having counter reciprocating strokes whereby on the forward stroke of the pivot arm and the rearward stroke of the wobble plate the wobble plate drive arm and the pivot arm posts are transversely overlapping.

8. The saw of claim 1 wherein the second drive comprises a cam lifter connected to and drivable by the drive shaft for converting rotary motion of the drive shaft to a reciprocating output transverse to the longitudinally extending axis.

9. The saw of claim 1 wherein the first drive is a wobble plate drive.

10. The reciprocating saw of claim 1, wherein the counterweight is saddle-shaped.

11. A reciprocating saw comprising:

a housing;

an output shaft mounted for reciprocal motion fore and aft in the housing along a longitudinally extending axis;

a motor mounted in the housing;

a drive shaft driven by the motor and mounted in the housing for rotary motion about a drive shaft axis;

a first drive connected to the drive shaft and the output shaft for reciprocally driving the output shaft;

a counterweight slidably mounted in the housing and reciprocally drivable relative to, and along the longitudinal axis of the output shaft; and a second drive interconnecting the counterweight and the drive shaft for reciprocally driving the counterweight, the second drive attached to the counterweight at two points disposed on opposite sides of the longitudinally extending axis;

the counterweight having a substantially U-shaped portion terminating in first and second lower ends, the lower ends disposed on opposite sides of the longitudinally extending axis, the arcuate portion defining an opening for longitudinally receiving the drive shaft.

12. The saw of claim 11 wherein the second drive includes a cam lifter connected to and drivable by the drive shaft for converting rotary motion of the drive shaft to a reciprocating output transverse to the longitudinally extending axis.

13. The reciprocating saw of claim 11 wherein the second drive includes a pivot arm having a cross bar extending in a direction substantially perpendicular to the longitudinally extending axis and first and second spaced posts upwardly extending from the cross bar and coupled to the first and second opposed legs of the counterweight.

14. The saw of claim 13 wherein the first end of the pivot arm has a spherical bearing formed on its distal end, and further including a cam lifter having a cam and a sleeve, the cam fixed to and rotatable with the drive shaft, the sleeve fixed against rotation relative to the housing, mounted on and permitting rotation of the cam and having an aperture for receiving the spherical bearing of the first end of the pivot arm.

15. The saw of claim 13 wherein the pivot arm is pivotal about a pivot axis (1) transverse to the longitudinally extending axis and (2) spaced between the drive shaft and output shaft.

16. The saw of claim 13 wherein the first and second posts have first and second spherical bearings formed, respectively, at the distal ends of the first and second post, and the counterweight has first and second spaced apertures for slidably and pivotally receiving respectively the first and second spherical bearings.

17. The reciprocating saw of claim 11 wherein the counterweight is slidably mounted on the output shaft and the counterweight further includes first and second opposed legs located on opposite sides of the output shaft and extending in a direction substantially parallel to the longitudinally extending axis, the first and second opposed legs both directly connected to the second drive.

18. The saw of claim 11 wherein the first drive includes a wobble plate drive having a drive arm connected to the output shaft forwardly of the second drive, the wobble plate drive and the pivot arm having counter reciprocating strokes whereby on the forward stroke of the pivot arm and the rearward stroke of the wobble plate the wobble plate drive arm and the pivot arm posts are transversely overlapping.

19. The saw of claim 11 wherein the first drive is a wobble plate drive.

* * * * *